United States Patent [19]

Kirson

[11] Patent Number: 5,220,507
[45] Date of Patent: Jun. 15, 1993

[54] LAND VEHICLE MULTIPLE NAVIGATION ROUTE APPARATUS

[75] Inventor: Allan M. Kirson, Highland Park, Ill.

[73] Assignee: Motorola, Schaumburg, Ill.

[21] Appl. No.: 958,533

[22] Filed: Oct. 8, 1992

Related U.S. Application Data

[63] Continuation of Ser. No. 610,636, Nov. 8, 1990, abandoned.

[51] Int. Cl.$^5$ .............................................. G08G 9/00
[52] U.S. Cl. .................................... 364/444; 340/995
[58] Field of Search ........................ 364/443, 444, 449; 340/988, 990, 995; 73/178 R

[56] References Cited

U.S. PATENT DOCUMENTS

| | | | |
|---|---|---|---|
| 4,511,973 | 4/1985 | Miura et al. | |
| 4,570,227 | 2/1986 | Tachi et al. | |
| 4,635,202 | 1/1987 | Tsujii et al. | |
| 4,757,455 | 7/1988 | Tsunoda et al. | 364/449 |
| 4,796,189 | 1/1989 | Nakayama et al. | |
| 4,897,792 | 1/1990 | Hosoi | 364/449 |
| 4,926,336 | 5/1990 | Yamada | |
| 4,951,211 | 8/1990 | De Villeroche | 364/444 |

FOREIGN PATENT DOCUMENTS 1-130299  5/1989  Japan ...................... 340/990

OTHER PUBLICATIONS

Autoroute Software Guide, Version 1.1, Feb. 24, 1988.
Various product announcements for autoroute system, including pp. 170, 172 of Jun. 1988 PCW.
*Transportation for the Future*, "Automobile Navigation Technology: Where Is It Going?" by Robert L. Franch, May 24-25, 1988.

*Primary Examiner*—Jack B. Harvey
*Assistant Examiner*—Edward J. Pipala
*Attorney, Agent, or Firm*—Phillip H. Melamed; John H. Moore

[57] ABSTRACT

Land vehicle multiple navigation route apparatus (10) includes a computer (11) for calculating at least first and second navigation routes (1, 2, or 3) between start (72) and destination (73) locations. Both routes are preferably visible to the vehicle operator at the same time along with route criteria such as route travel mileage and/or route estimated travel time. The vehicle operator then selects which of the displayed routes is to be used for providing him with route guidance information to the desired destination. The route display format may be a graphic map display (70) with routes displayed in different colors on a color CRT display (18). The second navigation route is calculated after calculating the first route, preferably by excluding some road path segments (1D) which were included in the first calculated route. Preferably the criterion to be used for alternate route calculation is determined prior to calculation of the first route. Preferably a vehicle operator has a choice of routes which may be used for route guidance to a destination without requiring vehicle operator input after the calculation of the first route to specify how to arrive at a second route.

15 Claims, 3 Drawing Sheets

LAND VEHICLE MULTIPLE NAVIGATION ROUTE APPARATUS

This is a continuation of application Ser. No. 07/610,636, filed Nov. 8, 1990 and now abandoned.

FIELD OF THE INVENTION

The present invention relates to the field of land vehicle navigation route apparatus in which a desired route is calculated between a start location and a desired destination location. More specifically, the present invention relates to navigation apparatus for calculating a route, via fixed road paths, which may be used to provide route guidance information to the operator of a land vehicle.

BACKGROUND OF THE INVENTION

Many prior land vehicle navigation route apparatus are known in which a desired route between a start location and a desired destination location are calculated via fixed road path segments. In such prior systems, typically a vehicle operator will specify his desired destination location. The prior system then determines the start position of the vehicle, or this information may also be input to the system by the vehicle operator. Prior systems then use stored road map data to select an optimum route between the start and destination location. This optimum route is selected according to a predetermined criterion which strives for either minimum distance or minimum time. The route is calculated by considering various characteristics associated with the road path segments that may be utilized in the route wherein such characteristics are stored along with the map data that defines the location of the road path segments.

Many of the above noted prior navigation systems allow the vehicle operator to specify route preferences for the route to be calculated. Thus, for example, the vehicle operator may specify that he prefers multiple lane road paths and expressways, and the navigation apparatus will accommodate these desires in calculating the navigation route. Some systems also allow the vehicle operator to specify detours which are defined as specific road segments or areas to be avoided during the navigation route. Typically, all of these preferences and detours (exclusions) are specified prior to the calculation of a navigation route. The navigation apparatus then proceeds to calculate the single optimum navigation route between the start and destination locations.

If the vehicle operator does not like the calculated optimum route, he then has to enter additional preference or detour (exclusion) information and the route calculation will then take place all over again. Since typically the route calculation step is a lengthy time consuming step and calculation of an alternate route occurs after the operator specifies additional information, this slows down the trip planning of the vehicle operator. Also, if the vehicle operator does not like a second calculated route but prefers the first calculated route, he must then enter additional information to restore the original preferences and detours used to calculate the initial route. In other words, the prior route navigation apparatus calculates one optimum route for one set of vehicle operator specified inputs. If the vehicle operator merely asks his navigation system to calculate another route without changing any input, the navigation apparatus will compute the exact same route. If the vehicle operator modifies the input data, then a new route can be calculated, but in order to select the previous route he has to implement an additional modification of input data to recalculate and then reselect the original calculated route. Also, the vehicle operator may not accurately recall differences between two sequentially calculated routes and may therefore have a hard time intelligently selecting which route he desires.

What is needed is a navigation route apparatus which minimizes the problems mentioned above and allows intelligent vehicle operator selection of a desired route without any undue delay in providing the vehicle operator this option.

OBJECTS OF THE INVENTION

An object of the present invention is to provide an improved land vehicle navigation route apparatus in which multiple navigation routes are calculated and displayed, such displayed routes preferably being displayed to the vehicle operator to allow his selection of any of the displayed routes for some further use.

A more specific object of the present invention is to provide an improved land vehicle multiple navigation route apparatus in which a second desired navigation route is calculated in accordance with a predetermined exclusion criterion thus eliminating the need for the vehicle operator specifying an exclusion criterion for the second route after the calculation of a first route.

Another object of the present invention is to provide an improved land vehicle multiple navigation route apparatus in which at least two navigation routes are calculated and road segment data defining each of these routes is stored until the vehicle operator selects which one of the navigation routes should be used for providing route guidance information.

BRIEF DESCRIPTION OF THE DRAWINGS

For a more complete understanding of the present invention, reference should be made to the drawings in which.

DESCRIPTION OF THE PREFERRED EMBODIMENTS

Figure 1:
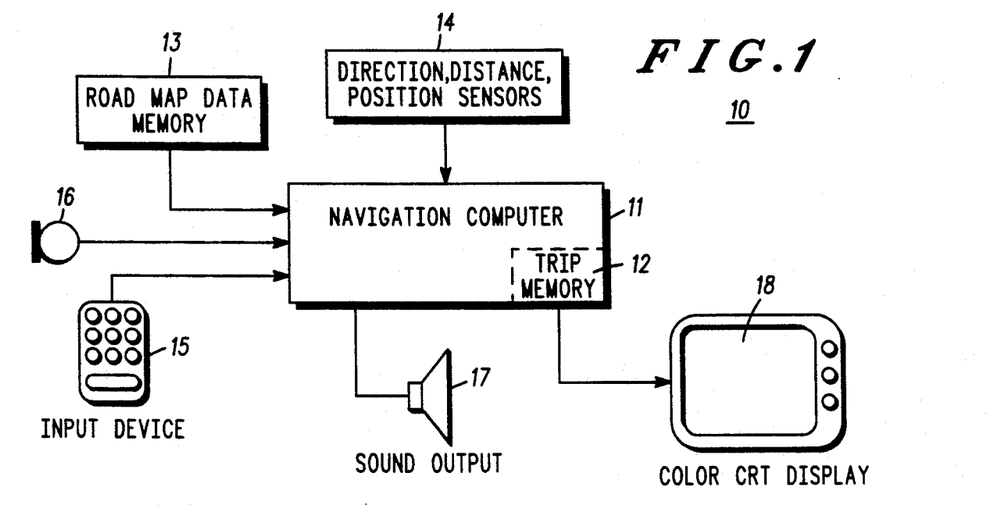
FIG. 1 is a schematic diagram of a land vehicle multiple navigation route apparatus.

Referring to FIG. 1, a navigation apparatus 10 in accordance with the present invention is illustrated. The navigation apparatus includes a navigation computer 11 having contain therein a trip memory 12 which is illustrated in more detail in FIG. 2. The navigation computer 11 receives input information from (a) a road map data memory 13, (b) direction, distance and position sensors 14, (c) a keyboard type input device 15 and (d) a microphone 16. The navigation computer provides an audible output via a speaker 17 and provides a visual output via a color CRT display device 18. The components in FIG. 1 are all intended for installation in a land vehicle and comprise a land vehicle navigation apparatus which receives input information, calculates a desired route and provides route guidance information, in audible and visual form, to a vehicle operator to implement the desired navigation route for the vehicle.

Essentially, the navigation computer 11 receives road map data from the memory 13 such that it is aware of all the existing roads and the characteristics of these road such as their speed limit, width and whether or not the roads are limited access roads such as expressways. In addition, it is also preferably aware of the location of significant landmarks and of the address numbering system used throughout its road map area. The navigation computer is aware of the current position of the vehicle and its direction of travel, as well as elapsed distance traveled, via the inputs provided by the sensors 14. These sensors may include position sensors, such as a global positioning system (GPS) radio receiver that precisely locates the position of the vehicle, as well as direction sensors such as differential odometers and/or compasses and elapsed distance travel sensors such as are typically connected to wheels of the vehicle. The navigation computer 11 will monitor the position of the vehicle via global positioning sensors and/or dead reckoning techniques based on vehicle direction and distance traveled. The computer 11 then typically superimposes the calculated vehicle position on the road map segments defined by the road map data in the memory 13 to determine the vehicle position. The apparatus 10 may provide a visual display indicating the position of the vehicle on a visual road map display provided on the display 18.

The vehicle operator controls the operation of the navigation computer via input devices such as the keyboard input device 15 and/or a microphone 16 since it is contemplated that the navigation computer may respond to audible commands using voice recognition techniques. In any event, the vehicle operator will enter into the navigation computer data concerning a desired destination. The computer already knows the present vehicle location due to the sensors 14 and is aware of what roads exist in the area due to the data in memory 13. The navigation computer then proceeds to calculate an optimum road path route between the start position of the vehicle and the desired destination. This road path route is optimized based on either a minimum time or minimum distance criterion which criterion is preprogrammed into the navigation computer 11. In addition, the route selected by the computer 11 will also take into account any trip preferences and detours which are stored in the trip memory 12. Trip preferences relate to specific travel preferences either preprogrammed into the navigation computer or programmed therein by the vehicle operator prior to the calculation of a desired route. Such preferences could, for example, comprise telling the computer that it should use expressways whenever possible or use multiple lane roads which are not limited access whenever possible. In addition, travel "detours" are also stored in the trip memory 12 wherein these detours comprise road segments or areas which are to be excluded when the navigation computer calculates a desired route. Thus the vehicle operator may wish to avoid all expressways during the trip or avoid roads having a narrow road width or a low height clearance due to viaducts or power lines.

In any event, the navigation computer 11 calculates a desired route using the present vehicle location, specified destination, preference and detour information all of which are stored in the trip memory 12. After calculation of an optimum route, the navigation computer 11 will store road segment data in a portion of the trip memory 12 which data defines the calculated route. This road segment data which defines the route is then utilized by the computer to provide audible instructions to the vehicle operator so as to guide him to the desired destination. Preferably this occurs by providing audible information from the speaker 17 as to the type of maneuver to be implemented at various road intersections, and the display 18 is used to provide a visual display of complex vehicle maneuvers to be implemented in conjunction with the audible instructions. Navigation systems which generally function as those described above are acknowledged to be prior art and the present invention represents an improvement to such systems as will be discussed below.

Figure 2:
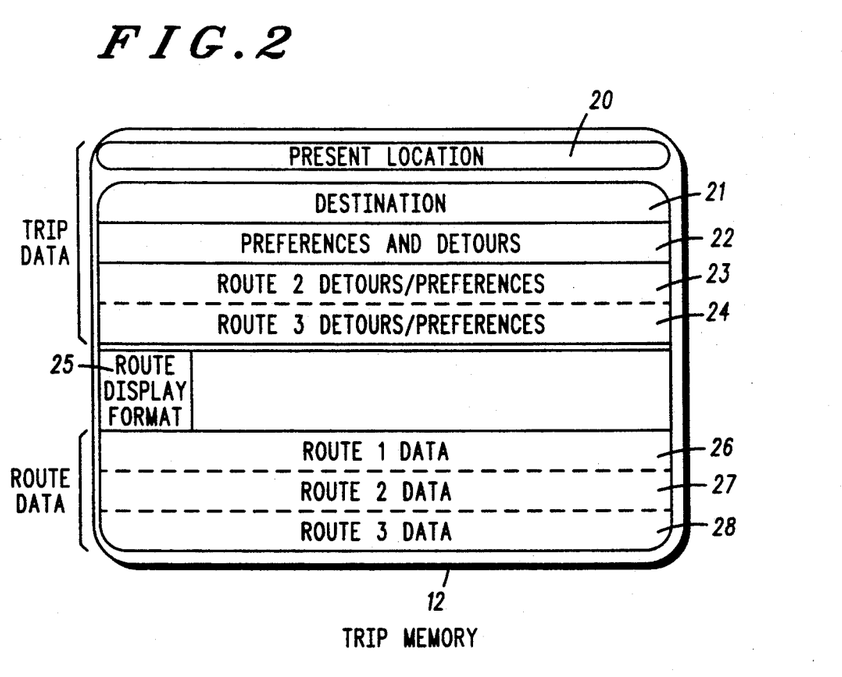
FIG. 2 is a detailed schematic diagram of a trip memory which is part of the apparatus shown in FIG. 1.

Referring to FIG. 2, the trip memory 12 is shown in more detail as comprising various memory portions in which appropriate data is stored. The trip memory 12 includes a present vehicle location portion 20 and a destination portion 21 in which data identifying the vehicle's present position and the desired destination of the vehicle are stored. A preferences and detours portion 22 of the trip memory 12 stores any trip preferences and detours which are either preprogrammed into the navigation computer 11 or are programmed therein by the vehicle operator prior to any route calculation for travel to the desired destination. The trip memory 12 also includes storage locations 23 and 24 in which additional detour or preference information will be stored that will be used in calculating a second and third route, respectively, to be calculated by the navigation computer 11. The data stored in the memory portions 20 through 24 is referred to herein as "trip data" since this data defines the parameters of the desired trip between the present start location of the vehicle and its destination and defines the type of criteria to be used by the computer in calculating three different routes that the vehicle may take to arrive at the desired destination.

The trip memory 12 also includes a memory portion 25 in which information concerning what type of route display format should be implemented for a visual display of the three routes that the navigation computer 11 will display according to the present invention. Essentially, either a text description of each of these routes will be provided as a visual display, or a graphic visual display will be provided that graphically illustrates road segments that connect the present vehicle location to the desired destination location.

The trip memory 12 also includes memory portions 26, 27 and 28 in which road segment data is stored which defines each of three different routes 1 through 3 which are to be calculated by the navigation computer 11. The data stored in the locations 26 through 28 is referred to herein as "route data" since the data in any one of the memory portions 26 through 28 will define a route, via fixed road segment data, which connects the present vehicle location to the desired destination.

Essentially, prior navigation systems used a computer to calculate one optimum route to a desired destination location based on preferences and detours supplied by the vehicle operator. If the vehicle operator didn't like the calculated route, he could request recalculation of a route. However, unless the vehicle operator changed some input regarding the trip the computer would always calculate the same route because it was programmed to select the optimum route between the vehicle location and its destination. The vehicle operator could alter the operation of the computer by adding additional preferences or detours after the calculation of a first route and thereby cause the navigation computer to calculate a second route. However, this would substantially slow down the trip calculations done by the computer since the computer would have to wait for input information from the vehicle operator. Also, if prior navigation computers were asked to calculate a new route they would do so and typically not store the information defining the previous route. Thus if the vehicle operator, after seeing the second route, now determines that the first route was preferable he would have to again change the preference and detour information back to its original setting and have the navigation computer recalculate the first route. Obviously such operation is not desirable.

The present invention overcomes the deficiencies noted above by having the navigation computer 11 sequentially calculate several, and in the present case three, different routes between the present location and the desired destination. This occurs without the need for receiving any additional preference or detour information from the vehicle operator after the calculation of the first route. In addition, the navigation apparatus 10 will display to the vehicle operator each of the calculated routes along with preferably both the mileage associated with each route and the travel time associated with each route. Thus the vehicle operator will now have a visual display of each of three different routes along with ranking criteria describing the mileage and travel time differences between the routes. Then the vehicle operator can select which of the three calculated routes he desires with regard to implementing vehicle guidance instructions for the vehicle operator so as to arrive at the desired destination. No prior systems appear to operate in this manner. The way in which the navigation apparatus 10 implements the above discussed features is generally described by a flowchart 30 shown in FIG. 3 which results in providing the visual displays shown in FIGS. 4 and 5. This will now be discussed in detail.

Figure 3:
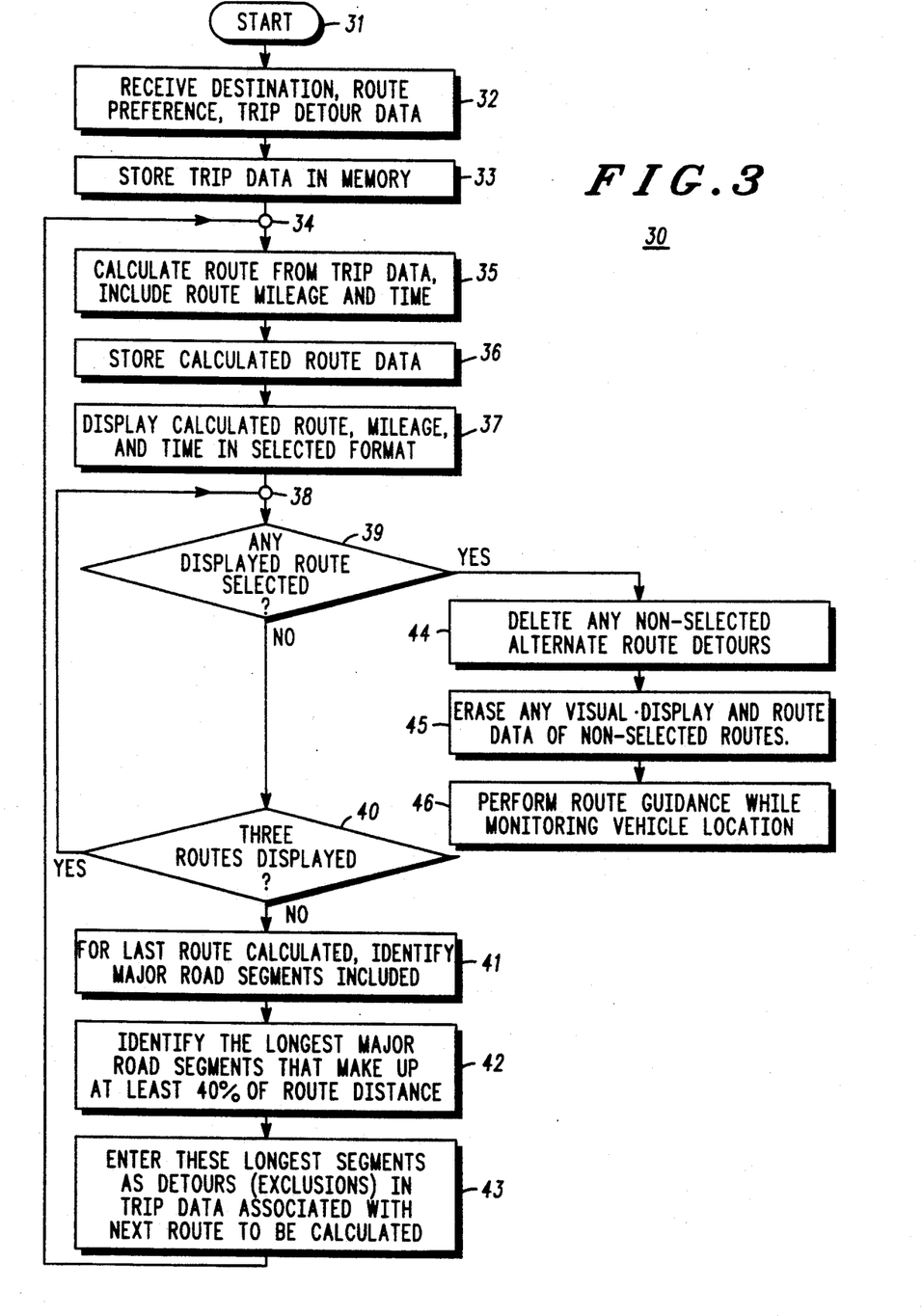
FIG. 3 is a schematic diagram of a flowchart which illustrates the operation of the navigation apparatus shown in FIG. 1.

Referring to FIG. 3, the flowchart 30 shown therein represents the preferred operation of the navigation apparatus 10 shown in FIG. 1. More specifically, the flowchart 30 represents the programming of the navigation computer 11 so as to implement the desired operation of the navigation apparatus 10. The flowchart 30 commences at a start location 31 and proceeds to a process block 32 representative of the navigation computer 11 receiving destination, route preference and trip detour data which are stored in the memory portions 21 and 22 of the trip memory 12. The vehicle's present location is stored in the location 20 and is provided by the sensors 14. The process block 32 is indicative of the computer 11 receiving the destination and any route preference and trip detour data provided by the vehicle operator via the key board input device 15 and/or the microphone 16. Providing information via the microphone 16 is possible since the computer 11 preferably includes a voice recognition circuit to translate audible instructions received by the microphone into computer commands. A process block 33 is representative of storing this received trip data in the trip memory 12 in the memory locations 21 and 22.

From process block 33 control passes to a terminal 34 and then onto a process block 35 indicative of the navigation computer 11 calculating an optimum route based on the stored trip data in the memory locations 20, 21 and 22. The navigation computer will also calculate the total mileage and estimated travel time for this optimum route. The characteristics of mileage and travel time may have been used by the computer 11 in determining what the optimum route between the start location and destination comprises. The estimated travel time can be roughly approximated by noting the speed limits of the selected routes as well as having stored in the computer 11 prior or current data of travel times versus elapsed distance for each of the roads in the road map data memory 13. The road segment data which defines the calculated optimum route is then stored in one of the route data memory locations 26 through 28 and this is indicated by the process block 36. The first time the process blocks 35 and 36 are executed, a first optimum route is calculated and the road segment data for this first calculated route, as well as elapsed mileage and estimated time data for this route, is stored in the route data memory location 26. If process blocks 35 and 36 are executed a second and third time, then a second and third route will be calculated and stored in route data memory locations 27 and 28, respectively.

Figure 4:
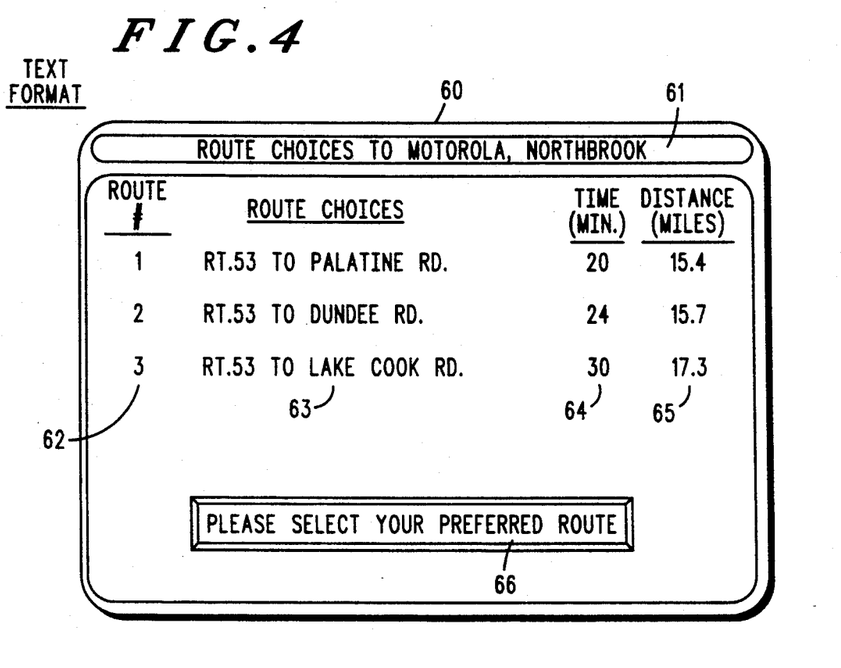
FIG. 4 is a graphic representation of one embodiment for a visual display provided by the navigation apparatus shown in FIG. 1.
Figure 5:
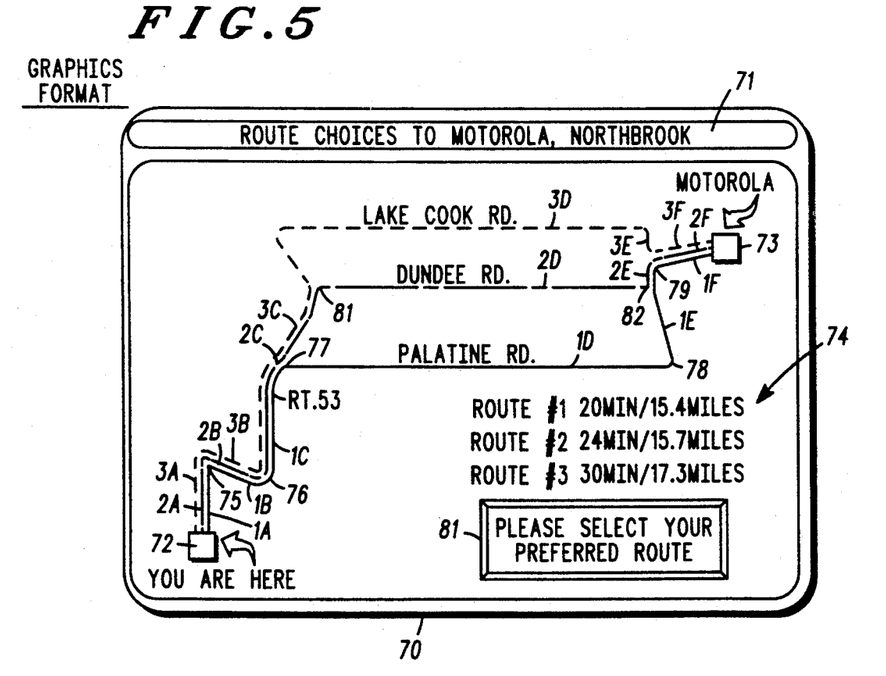
FIG. 5 is a graphic representation of another embodiment for a visual display provided by the navigation apparatus shown in FIG. 1.

After the process block 36, control passes to a process block 37 which is indicative of providing a visual display, via CRT display 18, of the route which was just calculated, including a visual display of its mileage and estimated time. The display shows the route just calculated along with visibly displaying at the same time any previously calculated routes. This visual display is provided in a selected format which is determined by what type of format information is stored in the memory location 25 in the trip memory 12. FIGS. 4 and 5 illustrate text and graphic formats, respectively, for the visual display to be provided on display 18 by the navigation apparatus 10 shown in FIG. 1.

In FIG. 4, a text format visual display 60 is illustrated which includes identification of the destination, for example the Motorola Building in Northbrook, Ill., by virtue of a visual banner legend 61. Then a route number associated with each of the calculated routes is displayed in a Route number column 62 followed by a word description of the route in text form under a Route Choice column 63 along with elapsed time for this route in a Time column 64 and an elapsed distance for this route in a Distance column 65. Each row of the displayed data for each route is preferably displayed in one color, with each route having a different associated color. The vehicle operator is then instructed to "PLEASE SELECT YOUR PREFERRED ROUTE" by virtue of an action legend 66 which is visually displayed. Preferably as each of three different routes is calculated by the computer 11 they will be displayed. FIG. 4 shows one way to display the calculated routes at one time.

FIG. 5 illustrates displaying the same type of route information by virtue of a road segment graphics display. In FIG. 5 a graphics visual display 70 is illustrated which includes a destination banner 71 and a visual display of a vehicle start location 72 and a destination location 73. In addition, a visual road map, which includes locations 72 and 73, is displayed and each of the three routes to be calculated will be visually displayed as graphic road segments which connect the start location 72 and destination location 73. Preferably each of the routes to be calculated is displayed in a separate distinct color along with a legend, in the same color, identifying the route and its elapsed travel time and travel distance. For example, a legend 74 identifies a first route #1 which proceeds from start location 72 to a way point 75 defining a first road segment IA. Then the route continues to way point 76 defining a second road segment IB and then on to way points 77, 78, and 79 and then onto destination location 73. This defines road segments 1C, 1D, 1E, and IF, respectively. Again a visual vehicle operator instruction banner 81 is provided to indicate to the vehicle operator that he should select his preferred navigation route.

Referring again to FIG. 3 after the process block 37 control passes to a terminal 38 and then onto a decision block 39 which inquires if the vehicle operator has selected any of the displayed routes. If the answer is no, then control passes to another decision block 40 which inquires if a total of three routes have already been displayed. If all three calculated routes are currently being displayed, then control recycles back to the terminal 38 and the loop, consisting of terminal 38 and decision blocks 39 and 40, is constantly reexecuted until the vehicle operator makes his route selection.

If the decision block 40 determines that all three routes have not yet been displayed to the vehicle operator, then control passes from the decision block 40 to a process block 41. Process block 41 identifies, for the last route which was calculated by the navigation computer 11, the major road segments which were included in this calculated route. Thus, for route #1 process block 41 would identify the road segments 1A through 1F that exist between start location 72 and destination location 73. After process block 41, control passes to a process block 42 which identifies the longest major road segments that makeup a total of at least 40% of the total route distance for the calculated route. With regard to route #1, this comprises the road segment 1D. After process block 42, a process block 43 is implemented which enters this identified longest road segment as an additional detour (exclusion) in the trip data which will be associated with the next (second) route to be calculated. Thus after the first route has been calculated, the longest road segments of that route will now be entered (stored) as detours for the next route. These longest road segments to be used as detours for the calculation of the second route will be stored as detour information in memory location 23. Control then recirculates back to the terminal 34 and from there to the process block 35.

The process block 35 now calculates a second route (#2) from the stored trip data which now includes the second route detour data stored in the location 23. Thus the process block 35 now calculates the route #2 displayed in FIGS. 4 and 5. Preferably this second route, consisting of road segments 2A to 2F, will be displayed along with the previously displayed route #1. Thus the visual displays of routes #1 and #2 will be visible at the same time. However route #2 will be displayed in a color different from the color used for visually displaying route #1. Process block 36 now stores this calculated second route as road segment data wherein this storage now occurs in the memory location 27 which is reserved for storing road segment data defining the second calculated route. The process block 37 now visually displays this second calculated route, including its time and mileage data, along with the visual display of the first calculated route. The decision block 39 then asks if any of the displayed routes have now been selected. Again if no routes have been selected but less than three routes have been displayed, the process blocks 41 through 43 will again be reexecuted resulting in the process block 35 calculating a third route by also excluding the longest travel segments identified for the second calculated route. These segments were stored in memory location 24 by process block 43. In the second calculated route these longest travel segments comprise the road segment 2D shown in FIG. 5 between way points 81 and 82. By allowing the road segment 2D to now become an additional detour for the calculation of a third route by block 35, and by using this third route detour in location 24 in addition to the detours in location 23 used for calculating the second route, a third route (#3) is now calculated along with its elapsed time and mileage. This third route, comprising road segments 3A-3F, is now displayed along with the first two routes and road segment data for the third route is stored in location 28 by process block 36. The calculation of the alternate routes #2 and #3 occurs in accordance with the exclusion criterion defined by process blocks 41-43, which criterion is defined prior to the calculation of route #1 by the programming of computer 11. This criterion determines how the calculation of the second (or third) route is to differ from the calculation of the previously calculated route.

With the navigation apparatus 10 operating as described above, the vehicle operator is given a choice of three different displayed routes and is made aware of the mileage and elapsed time associated with each of these routes. The vehicle operator can then select which one of these routes should be used to provide him with vehicle guidance instructions to arrive at the desired location. Whenever the vehicle operator has selected one of the displayed routes, control passes from the decision block 39 to a process block 44 which results in deleting or erasing any of the nonselected alternate route detours stored in the memory locations 23 or 24.

From process block 44, control passes to process block 45 which erases any visual display of at least the nonselected routes and any route data in locations 26, or 28 for any of the nonselected routes. Then control passes to a process block 46 which performs route guidance for the vehicle while monitoring vehicle location wherein this route guidance is performed in accordance with the route data for the selected route which is stored in one of the memory locations 26 through 28.

Preferably, the vehicle operator may select which one of the visual formats shown in FIGS. 4 and 5 should be visually provided to him, and this can be done via the microphone 16 or the keyboard input device 15. Also, the vehicle operator may select any of the displayed routes at any time after they are displayed. Thus, for example, if after seeing the first calculated route the vehicle operator determines that this route is suitable he may immediately select it and terminate the route calculation process with regard to calculating the second and third alternate routes. Thus he does not need to wait for the calculation and display of all three routes before he selects his desired navigation route. Thus the selection of any displayed route by the operator can result in a computer interrupt routine which immediately transfers control to process block 44 and stops the route calculating of block 35.

The apparatus 10 allows the vehicle operator to select any of the visually displayed routes for use in providing the vehicle operator with vehicle guidance instructions.

However, in a route planning system which may not have vehicle guidance apparatus, the selected route could be used for other purposes, such as allowing the vehicle operator to obtain additional information about the selected route, such as weather information along the selected route and/or roadside facility information along the selected route. Thus the selected route could be used for purposes other than route guidance.

While I have shown and described specific embodiments of this invention, further modifications and improvements will occur to those skilled in the art. One such modification could be providing more or less than three alternate routes to arrive at a desired destination. In addition, clearly another criterion for calculating an alternate route could be used rather than the criterion defined by the process blocks 41 through 43 which defines how to obtain detour information to be used for calculating alternate routes. Also, initiating a second or third route calculation could take place only if the vehicle operator indicates, by voice or key command, that he desires an alternative route, but he does not want to specify himself what additional detour or preference data should be used for the alternate route calculation. Also, if the first route calculated by process block 35 is optimized for a minimum mileage criterion, then a second route could be calculated by choosing a minimum time criterion instead of minimum mileage, preferably as long as this alternate route criterion was determined prior to calculating the first route. All such modifications which retain the basic underlying principles disclosed and claimed herein are within the scope of this invention.

What is claimed is:

1. Land vehicle multiple navigation route apparatus comprising:
    means for calculating and storing a first desired navigation route for a vehicle, via fixed road path segments, between a start location and a desired destination location, said first route calculating and storing means determining at least one of the travel mileage of and the estimated time for said first route;
    means for calculating and storing at least a second desired navigation route, different from said first route, between said start and destination locations and determining at least one of the travel mileage of and estimated time for said second route;
    display means coupled o said first and second route calculating and storing means for visually displaying to the vehicle operator in a predetermined display format at least each of said first and second routes along with at least one of the travel mileages and estimated times for each of the displayed routes, each of said displayed first and second routes being visible at the same time;
    means for said vehicle operator selecting any one of said displayed first and second routes; and
    means for selecting the display format in which said display means will visually display each of said first and second routes, said first and second routes being displayable in a text format in which each route is identified by text which identifies major road segments, rather than providing a graphic map path display between visually displayed start and destination locations, and a graphic display format in which a graphic map path is visually displayed between visual displays of the start and destination locations.

2. Land vehicle multiple navigation route apparatus comprising:
    means for calculating a first desired navigation route for a vehicle, via fixed road path segments, between a start location and a desired destination location, said first route calculating means determining at least one of the travel mileage of and the estimated time for said first route;
    means for calculating at least a second desired navigation route, different from said first route, for said vehicle between said start and destination locations by excluding from said second route, in accordance with a predetermined exclusion criterion determined prior to calculation of said first route, some road path segments included in said first route, said second route calculation means determining at least one of the travel mileage of and the estimated time for said second route, said criterion determining how calculation of said second route is to differ from calculation of said first route, said predetermined exclusion criterion established by said second route calculation means including means for identifying said road path segments which form said first calculated route and selecting some road path segments from said identified first route road path segments for exclusion and means for excluding said selected first route road path segments from inclusion in said second route when calculating said second route;
    display means for visually displaying to the vehicle operator in a predetermined display format each of said first and second routes along with at least one of the travel mileages of and estimated times for each of the displayed routes;
    means for said vehicle operator selecting any one of said displayed first and second routes;
    means for providing route guidance information to said vehicle operator in accordance with said selected route; and
    means for storing road segment data which defines each of said first and second calculated routes until at least selection of a route for route guidance by said vehicle operator.

3. Land vehicle multiple navigation route apparatus according to claim 2 wherein said visual display of each of said first and second routes along with at lest one of the travel mileages of and estimated times for the displayed routes are visible at the same time.

4. Land vehicle multiple navigation route apparatus according to claim 3 wherein said display means visually displays both of said travel mileages of and estimated times for each of the displayed routes.

5. Land vehicle multiple navigation route apparatus according to claim 4 wherein said display means displays each of said displayed first and second routes in a different color.

6. Land vehicle multiple navigation route apparatus according to claim 2 which includes means for selecting the display format in which said display means will visually display each of said first and second routes, said first and second routes being displayable in a text format in which a route is identified by text which identifies major road segment, rather than providing a graphic map path display between visual start and destination locations, and a graphic display format in which a graphic path is visually displayed between visual displays of the start and destination locations.

7. Land vehicle multiple navigation route apparatus according to claim 2 which includes means for storing data defining both said first and second calculated routes until at least said vehicle operator selects one of said displayed routes for route guidance.

8. Land vehicle multiple navigation route apparatus according to claim 2 which includes means for said vehicle operator selecting said first route prior to the display of said second route.

9. Land vehicle multiple navigation route apparatus according to claim 8 wherein said display means visually displays said calculated first route and then displays both said first and second calculated routes.

10. Land vehicle multiple navigation route apparatus comprising:
   means for calculating a first desired navigation route for a vehicle, via fixed road path segments, between a start location and a desired destination location;
   means for calculating, after calculating said first route, at least a second desired navigation route, different from said first route, for said vehicle between said start and destination location sin accordance with a predetermined exclusion criterion determined prior to the calculation of said first route, said exclusion criterion determining how calculation of said second route is to differ from calculation of said first route, said predetermined exclusion criterion established by said second route calculation means including means for identifying said road path segments which form said first calculated route and selecting some road path segments from said identified first route road path segments for exclusion and means for excluding said selected first route road path segments from inclusion in said second route when calculating said second route; and
   display means coupled to said first and second route calculation means for visually displaying to the vehicle operator in a predetermined display format each of said first and second routes.

11. Land vehicle multiple navigation route apparatus according to claim 10 which includes means for said vehicle operator selecting any one of said displayed first and second routes.

12. Land vehicle multiple navigation route apparatus according to claim 10 wherein said display means displays each of said first and second routes at the same time.

13. Land vehicle multiple navigation route apparatus comprising:
   means for calculating and storing a first desired navigation route for a vehicle, via fixed road path segments, between a start location and a desired destination location, said first route calculating and storing means determining at least one of the travel mileage of and the estimated time for said first route;
   means for calculating and storing at least a second desired navigation route, different from said first route, between said start and destination locations and determining at least one of the travel mileage of and estimated time for said second route;
   display means coupled to said first nd second route calculating and storing means for visually displaying to the vehicle operator in a predetermined display format at least each of said first and second routes along with at least one of the travel mileages and estimated times for each of the displayed routes, each of said displayed first and second routes being visible at the same time;
   means for said vehicle operator selecting any one of said displayed first and second routes; and
   means for selecting the display format in which said display means will visually display each of said first and second routes, said first and second routes being displayable in a text format in which each route is identified by text which identifies major road segments, rather than providing a graphic map path display between visually displayed start and destination locations, and a graphic display format in which a distinctive graphic map path is visually displayed for each route between visual displays of the start and destination locations.

14. Land vehicle multiple navigation route apparatus comprising:
   means for calculating a first desired navigation route for a vehicle, via fixed road path segments, between a start location and a desired destination location, said first route calculating means determining at least one of the travel mileage of and the estimated time for said firs route, said first route calculated in accordance with vehicle operator specificable route calculation criteria comprising preferences/detours;
   means for calculating at least a second desired navigation route, different from said first route, for said vehicle between said start and destination locations, in accordance with said vehicle operator specifiable route calculation criteria, by excluding from said second route, in accordance with a predetermined exclusion criterion determined prior to calculation of said first route, some road path segments included in sad first route, said second route calculation means determining at least one of the travel mileage of and the estimated time for said second route, said exclusion criterion determining, regardless of said user specificable route calculation criteria, how calculation of said second route is to differ from calculation of said first route, said predetermined exclusion criterion established b said second route calculation means including means for identifying said road path segments which form said first calculated route and selecting some road path segments from said identified first route road path segments for exclusion and means for excluding said selected first route road path segments from inclusion in said second route when calculating said second route;
   display means for visually displaying to the vehicle operator in a predetermined display format each of said first and second routes along with at least one of the travel mileages of and estimated times for each of the displayed routes;
   means for said vehicle operator selecting any one of said displayed first and second routes;
   means for providing route guidance information to said vehicle operator in accordance with said selected route; and
   means for storing road segment data which defines each of said first and second calculated routes until at least selection of a route for route guidance by said vehicle operator.

15. Land vehicle multiple navigation route apparatus comprising:

means for calculating a first desired navigation route from a vehicle, via fixed road path segments, between a start location and a desired destination location in accordance with operator specifiable route calculation criteria comprising preferences/detours;

means for calculating, after calculating said first route, at least a second desired navigation route, different from said first route, for said vehicle between said start and destination locations in accordance with said operator specifiable route calculation criteria and also in accordance with a predetermined exclusion criterion determined prior to the calculation of said first route, said exclusion criterion determining, regardless of said operator specifiable route calculation criteria, how calculation of said second route is to differ from calculation of said first route, said predetermined exclusion criterion established by said second route calculation means including means for identifying said road path segments which form said first calculated route and selecting some road path segments from said identified first route road path segments for exclusion and means for excluding said selected first route road path segments from inclusion in said second route when calculating said second route; and display means coupled to said first and second route calculation means for visually displaying to the vehicle operator in a predetermined display format each of said first and second routes.

* * * * *